United States Patent [19]

Jennings

[11] Patent Number: 4,654,320
[45] Date of Patent: Mar. 31, 1987

[54] CATALYSTS FOR AMMONIA SYNTHESIS AND PROCESS FOR PRODUCING THE CATALYST

[75] Inventor: James R. Jennings, Cleveland, England

[73] Assignee: Imperial Chemical Industries PlC, London, England

[21] Appl. No.: 758,412

[22] Filed: Jul. 24, 1985

[30] Foreign Application Priority Data

Aug. 3, 1984 [GB] United Kingdom ................ 8419851
Mar. 25, 1985 [GB] United Kingdom ................ 8507692

[51] Int. Cl.$^4$ .......................... B01J 21/04; B01J 23/78
[52] U.S. Cl. ..................................... 502/328; 423/363
[58] Field of Search ........................ 502/328, 336, 524; 423/363

[56] References Cited

U.S. PATENT DOCUMENTS 2,919,176  12/1959  Gross ................................... 423/362
4,049,582   9/1977  Erickson et al. ................. 502/524 X

FOREIGN PATENT DOCUMENTS 989242   4/1965  United Kingdom ................ 502/328
1182829  3/1970  United Kingdom .
598632   3/1978  U.S.S.R. .............................. 502/330

OTHER PUBLICATIONS

Rubinshtein et al., "Complex Investigation of Iron Catalysts of Ammonia Synthesis", Translation in Bulletin of the Academy of Sciences of the USSR, Division of Chemical Science, No. 10, pp. 1646–1650 (Oct. 1966).
Rubinshtein et al., "Extensive Study of the Iron Catalysts of Ammonia Synthesis", Kinetika i Kataliz, 1965, 6(2), pp. 285–293.

Primary Examiner—W. J. Shine
Attorney, Agent, or Firm—Cushman, Darby & Cushman

[57] ABSTRACT

An iron oxide containing precursor to a catalyst for e.g. ammonia synthesis, having a surface area above 10 $m^2 \cdot g^{-1}$ also containing alumina and an alkaline earth. The alkaline earth may be present as an alkaline earth aluminate. The composition may be made by precipitation followed by calcination. For use as an ammonia synthesis catalyst precursor, an alkali metal, e.g. potassium, is preferably incorporated into the composition to promote catalytic activity. The presence of "free" alkaline earth, as opposed to alkaline earth aluminate reduces the amount of alkali metal required.

10 Claims, No Drawings

CATALYSTS FOR AMMONIA SYNTHESIS AND PROCESS FOR PRODUCING THE CATALYST

This invention relates to catalysts and in particular to an oxidic precursor of an iron catalyst and a method for producing it.

Iron catalysts used for example in ammonia synthesis or nitrile hydrogenation are commonly made by steps including melting iron oxide possibly containing small quantities of other oxides, solidifying the melt and crushing the solid to the required particle size. It has been proposed, for example by Akimov et al. (Kinetika i Kataliz, 1965, 6(2), 285–293, published in translation by Consultants Bureau, New York, USA), to make an ammonia synthesis catalysts by co-precipitation of ferric hydroxide and aluminium hydroxide. With precursors made by that route, the precipitate is then calcined to convert the hydroxides to oxides and is then pelleted.

Providing the calcination temperature is not excessive, for example the calcination temperature should desirably not exceed 600° C., precipitated oxidic precursor compositions are characterised by a much higher surface area (BET method using nitrogen) than precursors prepared by the fusion route: while the latter generally have a BET surface area below $1 \text{ m}^2 \cdot \text{g}^{-1}$, precipitated oxidic precursors generally have a BET surface area of at least $10 \text{ m}^2 \cdot \text{g}^{-1}$.

Upon reduction of the precursor to convert the iron oxide to active metal catalyst, such precursors having a high BET surface area give rise to catalysts in which the active metal surface area (as measured by nitrous oxide decomposition) is significantly higher than in catalysts by the fusion route.

The alumina serves to act as a stabiliser to reduce sintering of the active metal on reduction and/or during use: Such sintering reduces the effective surface area of the active metal.

Despite their lower density compared to fused catalysts, precursors made by precipitation can give rise to catalysts having a greater activity per unit catalyst bed volume than catalysts made by the fusion route.

We have now found that particularly useful catalysts can be made if some alkaline earth is incorporated into the composition.

Accordingly the present invention provides an oxidic catalyst precursor composition having a BET surface area of at least $10 \text{ m}^2 \cdot \text{g}^{-1}$ and containing oxides of iron, aluminium, and at least one alkaline earth metal X, the proportions of said oxides being such that, after ignition at 600° C., the ignited composition contains at least 75% by weight of iron oxide (expressed as $Fe_2O_3$), at least 0.5% by weight of aluminium oxide (espressed as $Al_2O_3$), and at least 0.5% by weight of said alkaline earth metal oxide (expressed as XO). The alkaline earth metal may be barium or strontium, but is preferably calcium or most preferably magnesium.

The nature of the benefit given by the incorporation of the alkaline earth depends on the form in which it is present in the composition. Thus if present as an alkaline earth aluminate, e.g. that species that is precipitated by mixing solution of an alkali metal aluminate and an alkaline earth salt, particularly active catalysts can be obtained. The presence of alkaline earth aluminate is indicated by regions, as determined by scanning transmission electron microscopy, intimately mixed with the other components of the precursor, wherein the alkaline earth metal to aluminium atomic ratio is essentially 0.5.

In such compositions however it is not necessary that the composition as a whole contains aluminium atoms and alkaline earth metal atoms in the aforesaid atomic ratio: thus, as described hereinafter, the composition may contain an excess over the stoichiometric 1:2 ratio, of the aluminium or, preferably of the alkaline earth metal, atoms. However in compositions wherein some or all of the alkaline earth is present as the aluminate there are regions or particles having the aforesaid alkaline earth metal:aluminium atomic ratio of 0.5 i.e. indicative of an alkaline earth aluminate, $X Al_2O_4$, said regions or particles being intimately mixed with the other components of the catalyst precursor.

For use as an ammonia synthesis catalyst in order to promote catalytic activity, it is usual to incorporate into the precursor some compound of an alkali metal having an atomic number greater than, or equal to, 19.

However the amount of alkali metal compound required tends to increase as the aluminium content of the precursor increases: not only does this add to the cost, but also uniform dispersion of the alkali metal compound becomes more difficult as the proportion thereof increases. Moreover, increasing the alkali metal compound content tends to increase the rate of decline of catalyst activity with time.

We have found that the presence of free alkaline earth, as opposed to alkaline earth as alkaline earth aluminate, enables the amount of alkali metal compound required for promoting catalytic activity to be reduced. Without prejudice to the invention, it is thought that the free alkaline earth can neutralise acidic sites on the alumina, thus reducing the amount of alkali required.

To enable the alkali metal content required for activity promotion to be reduced significantly, in compositions wherein at least half of the aluminium is present as the alkaline earth aluminate, it is preferred that there is sufficient additional, i.e. free, alkaline earth present that the overall alkaline earth metal:aluminium atomic ratio is at least 1. In compositions wherein less than half of the aluminium is present as alkaline earth aluminate, it is preferred that the amount of free alkaline earth present is such that the overall alkaline earth metal:aluminium atomic ratio is at least 0.5.

In such free alkaline earth-containing compositions the total amount of alkaline earth present is preferably such that the alkaline earth metal:aluminium atomic ratio is below 5. The use of too much alkaline earth is undesirable because of difficulties in obtaining a uniform dispersion thereof in the composition. Also the use of too much alkaline earth naturally reduces the proportion of iron in the composition and so reduces the amount of active metal per unit catalyst volume. For this reason it is preferred that the proportion of alumina and alkaline earth are such that, in the composition after ignition at 600° C., the combined weights of alumina and alkaline earth (expressed respectively as $Al_2O_3$ and XO where X is the alkaline earth metal) amount to less than 20% by weight.

The use of such free alkaline earth containing compositions often enables the proportion of alkali metal which may be potassium, rubidium, or cesium, required to promote ammonia synthesis activity to be reduced to a level such that the alkali metal:aluminium atomic ratio is below 0.3, and preferably is in the range of 0.05 to 0.25.

The presence of sodium in the composition is generally undesirable: the amount of sodium, expressed as $Na_2O$, is preferably less than 0.1%, particularly less than 0.05%, by weight of the composition (after ignition) and is ignored when computing the alkali metal:aluminium atomic ratio. Where there is little or no free alkaline earth, the alkali metal:aluminium atomic ratio is normally above 0.15, particularly in the range 0.2 to 0.5, but may be somewhat higher for compositions of a high alumina content.

The iron oxide content (after ignition) is preferably at least 80% by weight and in particular is in the range 85-97.5% by weight.

The aluminium oxide content (including that, if any present as alkaline earth aluminate) (after ignition) is preferably in the range 1 to 10, particularly 2-8, % by weight (expressed as $Al_2O_3$).

The composition may also contain other oxidic materials, in particular cobalt oxide.

The compositions of the invention may be made by calcining at intimate mixture of iron, aluminium and alkaline earth metal compounds, such as hydroxides, carbonates, basic carbonates and/or alkaline earth aluminates, that are decomposable to the oxides by calcination. Where it is desired that the final composition exhibits the regions having the alkaline earth metal:aluminium atomic ratio of 0.5 the aforesaid intimate mixture should contain the alkaline earth aluminate as such prior to calcination.

Where the composition is to be used for ammonia synthesis, the intimate mixture may be impregnated with an alkali metal compound before or after calcination.

Alkaline earth aluminate containing intimate mixtures may be made by precipitation of the alkaline earth aluminate, preferably at a pH above 6.5, by mixing an aqueous solution of an alkali metal aluminate with an aqueous solution of an alkaline earth salt; the resultant slurry is then mixed with a precipitated hydrated ferric oxide: alternatively the iron may be precipitated, as a hydrated ferric oxide, into the alkaline earth aluminate slurry.

Where it is desired that the composition contains free alkaline earth, the latter may be co-precipitated, as the hydroxide and/or carbonate, with the iron from a solution containing both iron and alkaline earth salts. Where it is desired that the composition contains added alumina, the latter can be co-precipitated with the iron. Alternatively the alumina can be precipitated prior to precipitation of the alkaline earth aluminate.

Where an alkaline earth aluminate is not required, the iron, aluminium, and alkaline earth compounds can be precipitated simultaneously or sequentially or preformed precipitates intimately mixed.

The precipitation conditions are preferably such as to produce the hydrated iron oxide in gel form, especially if hydrated alumina is co-precipitated with the iron oxide, since then the alumina can also be in gel form and crystallographic incompatibility can be avoided. Alternatively the hydrated oxide is in the lepidocrocite (gamma FeOOH) form, in which event the alumina can be in the isomorphous böhmite ("gamma AlOOH" or "alpha alumina monohydrate") form. If desired, the crystal shape of the lepidocrocite can be deliberately controlled, for example in acicular shape, possibly using a shape-stabilising additive. Another possibility is to produce hydrated ferric oxide in the goethite (alpha FeOOH form) and to co-precipitate hydrated alumina in the diaspore ("beta alumina monohydrate") form as a minor component of mixed crystals.

The precipitation, or precipitations, is preferably effected at a pH of above 6.5 and at a temperature of 15° to 65° C. In a particularly preferred mode of operation the precipitation of at least the iron is effected by continuously feeding the aqueous iron solution and the precipitant to a junction from which the resultant precipitate is continuously removed.

The intimate mixture should then be washed, particularly where one or more of the reactants contained sodium, to remove soluble components. Normally the intimate mixture is then dried and calcined, typically at a temperature in the range 200°-500° C. The requisite amount of alkali metal can be incorporated by impregnating the precipitate, before or after calcination, with a suitable solution, e.g. potassium carbonate.

The resulting composition may then be pelleted or roll compacted: a fabrication aid such as graphite may be incorporated.

In preferred pelletised catalyst precursors, the iron oxide has an O:Fe atomic ratio in the range 1.2 to 1.4. Such precursors may be made by precipitation from a solution containing ferric and ferrous iron in a proportion corresponding to the desired O/Fe atomic ratio, then calcining that composition in a neutral or oxidatively balanced atmosphere to give the oxide. For this precipitation a dissolved reducing agent is desirable and the atomsphere in contact with the solutions should be neutral or balanced.

Alternatively, and preferably, the iron is precipitated in the ferric state and is then subjected to a controlled mild de-oxidation, e.g. by contacting with a reducing agent of controlled strength, for example a gaseous mixture of reducing and mildly oxidising compounds or heating it in an atmosphere of low enough oxygen content, for example in vacuo. If desired it can be done in the slurry phase by means of a gaseous or dissolved reducing agent.

In a preferred mode of operation, the calcined intimate mixture, optionally after incorporation of the alkali metal compound, is subjected to the de-oxidation by passage of a suitable gas stream thereover: the composition is preferably pelleted or compacted after such a de-oxidation step: however it may be desirable to pelletise or compact the composition prior to de-oxidation to enable the composition to be more readily handled before and during the de-oxidation step. In that case it is preferred that the composition is re-pelleted or compacted after the de-oxidation.

The use of a composition in which the oxide has an O:Fe atomic ratio in the range 1.2-1.4, ie an oxidation state corresponding approximately to that of magnetite, to make the catalyst precursor pellets or compacts has the advantage that the density of the pellets or compacts is increased compared to pellets or compacts made from a composition wherein the iron oxide is in the oxidation state corresponding to haematite. This enables a catalyst bed to have a greater iron content per unit bed volume to be achieved.

The step of de-oxidation to iron oxide in the specified O/Fe atomic ratio range is carried out preferably by means of a mixture comprising 10-90, especially 20-80, volume percent of oxidant gas, the balance being reductant gas, in addition to any non-reactant gases. Conveniently the oxidant gas is steam and the reductant gas is hydrogen. Steam is especially desirable when dehydration of hydrated iron oxide to an unwanted ferric oxide phase is to be avoided. Steam + hydrogen is preferred if the starting oxide contains compounds of sulphur or chlorine. Other mixtures include carbon monoxide+-carbon dioxide and also chemically reactive mixtures such as carbon monoxide+steam, methanol+steam and carbon dioxide+hydrogen, which require precautions to cope with exotherms or endotherms. Other organic compounds, possibly mixed with hydrogen and/or steam, can be used.

Using such a gas mixture the temperature of de-oxidation is typically in the range 250°–500° C. Higher temperatures within this range are desirable if the starting iron oxide is converted only slowly to the megnetite structure.

If de-oxidation in an atmosphere of low oxygen content is used, for example in vacuo or in a current of nitrogen or noble gas is used, the temperature is typically in the range 200°–300° C.

If the oxide having the desired O/Fe ratio is made of dehydration of a hydrated oxide already in that oxidation step, it may be subjected to a steam+hydrogen mixture to remove any compounds of sulphur or chlorine introduced during its preparation.

Reduction of the precursor to active catalyst is conveniently affected by hydrogen at a temperature in the range 300°–500° C. If the catalyst is to be used for ammonia synthesis, the reducing gas used is usually ammonia synthesis gas and is passed over the precursor in the reactor in which synthesis is to take place. Precautions are taken to avoid back-diffusion of water vapour into contact with iron formed by the reduction and to prevent over-heating once ammonia synthesis has begun. Alternatively the precursor can be reduced by nitrogen-free hydrogen. In either event the gas pressure is suitably in the range 1–300, for example 20–120 bar abs. In an alternative procedure the precursor is reduced outside the synthesis reactor and passivated by cool dilute oxygen to give "pre-reduced" catalyst, which thereafter is charged to the synthesis reactor and therein fully reduced.

The resulting catalyst has an iron surface area significantly greater than that of a fused catalyst.

The invention provides a process of ammonia synthesis over the catalyst and in these preferred conditions:
Temperature °C.: 300–500, especially 350–430.
Pressure, bar abs: 20–250, especially 40–120.
Gas mixture: $H_2/N_2$ up to 3.1, especially 2.5 to 3.0 or (as in our U.S. Pat. No. 4,383,982) 1.5 to 2.3.

The invention provides also a process of hydrogenating adiponitrile to hexamethylene diamine over the catalyst and in these preferred conditions:
Temperature °C.: 80–200
Pressure bar abs: 200–400
State of matter: preferably supercritical
Gas mixture: hydrogen+2-10 parts by weight of ammonia per part of adiponitrile.

EXAMPLE 1

An aqueous solution containing 0.67M ferric nitrate, 0.041M magnesium nitrate, and 0.011M aluminium nitrate respectively was fed at 40° C., at a rate of 0.83 ml·s$^{-1}$, to a flowing junction to which an aqueous solution containing 0.84M sodium carbonate, also at 40° C., was fed at such a rate so as to maintain the pH at the junction at the desired level.

The resultant precipitate was continuously removed from the junction and collected on a filter, washed until nitrate free and dried at 120° C.

The dried powder was then calcined for 6 hours, ground and wetted with an aqueous potassium carbonate solution so as to add the desired amount of potassium and dried.

The product was then pelleted, using 1% by weight of graphite as a pelleting aid, to form cylinders 8.8 mm diameter and 10 mm long.

The above procedure was repeated to give a series of catalyst precursors all of which had a BET surface area well above 10 m$^2$·g$^{-1}$. These catalyst precursors contained little, if any, of the aluminium as magnesium aluminate.

EXAMPLE 2

Magnesium aluminate containing precursors.

22.4 ml of 1M magnesium nitrate was added to 44.5 ml of 1M sodium aluminate together with sufficient nitric acid to maintain the pH at 7.0±0.5, thereby producing a slurry of "magnesium aluminate".

1800 ml of 0.67M ferric nitrate was added to 1800 ml of aqueous ammonia (specific gravity 0.88) to produce a slurry of ferric hydroxide precipitate at pH 12.

This slurry was added to the "magnesium aluminate" slurry and mixed until homogeneous. The product was filtered, washed, dried, calcined for 6 hours, ground, wetted with potassium carbonate solution, dried and pelleted as in Example 1.

The above procedure was repeated to give a range of precursors all of which had a BET surface area well above 10 m$^2$·g$^{-1}$. The precursors hereinafter designated 2E and 2F each had BET surface areas of 190 m$^2$·g$^{-1}$.

EXAMPLE 3

The procedure of Example 2 was repeated using an aqueous solution containing 0.66M ferric nitrate and 0.037M cobalt nitrate in place of the ferric nitrate solution. Again the precursors had a BET surface area well above 10 m$^2$·g$^{-1}$. The precursors were reduced to active catalyst and tested by the following procedure.

Samples of the pellets were crushed to the sieve range 0.6 to 1.0 mm and charged each to a laboratory reactor having a catalyst bed 3.2 mm in diameter and 32 mm long. Each charge was activated by reduction in a 3:1 hydrogen:nitrogen mixture at 50 bar abs. pressure, raising the temperature to 475° C. over 12 h and holding that temperature for 3 h. Then each charge was operated in ammonia synthesis at that pressure at 450° C. and at a space velocity of 40000 cm$^3$ of gas per g of catalyst per hour. From percentage conversions measured at this and other space velocities the "initial" rate constant, per unit catalyst precursor weight, is calculated.

To assess the rate of decline of activity an accelerated aging procedure is then adopted by increasing the temperature to 550° C. and maintaining that temperature for 6 hours. The temperature is then reduced to 450° C. and the conversion at various flow rates measured. The "final" rate constant, per unit catalyst precursor weight, is then calculated.

In the following table the initial and final relative activities are the ratio of the initial and final rate sonstants, respectively, to the initial rate constant of a standard fused catalyst.

| Sample | Precipitation pH | Calcination Temp. (°C.) | Composition (wt %)* | | | | Relative activity | | F/I |
|---|---|---|---|---|---|---|---|---|---|
| | | | Fe₂O₃ | Al₂O₃ | MgO | K₂O | Initial (I) | Final (F) | |
| 1A | 9.5 | 250 | 97.4 | 0.84 | 1.1 | 0.11 | 2.11 | 1.80 | 0.85 |
| 1B | 9.5 | 400 | 97.4 | 0.84 | 1.1 | 0.11 | 1.65 | 1.47 | 0.89 |
| 1C | 9.5 | 400 | 96.0 | 1.2 | 1.3 | 0.22 | 1.89 | 1.71 | 0.90 |
| 1D | 7 | 250 | 96.7 | 0.86 | 2.0 | 0.18 | 1.74 | 1.64 | 0.94 |
| 1E | 7 | 400 | 96.2 | 0.9 | 1.6 | 0.18 | 1.83 | 1.74 | 0.95 |
| 1F | 7 | 400 | 97.0 | 1.1 | 1.6 | 0.07 | 1.68 | 1.68 | 1.00 |
| 2A | 7/12 | 250 | 96.1 | 1.9 | 0.9 | 0.43 | 2.56 | 2.12 | 0.83 |
| 2B | 7/12 | 250 | 95.5 | 2.0 | 0.88 | 0.77 | 2.06 | 1.79 | 0.87 |
| 2C | 7/12 | 400 | 96.5 | 2.0 | 0.74 | 0.38 | 2.24 | 2.03 | 0.91 |
| 2D | 7/12 | 400 | 95.8 | 1.9 | 1.0 | 0.59 | 2.00 | 1.58 | 0.79 |
| 2E | 7/11 | 400 | 93.3 | 3.7 | 1.7 | 0.79 | 1.84 | 2.03 | 1.10 |
| 2F | 7/11 | 400 | 93.2 | 3.9 | 1.7 | 0.68 | 1.92 | 2.04 | 1.06 |
| 3A+ | 7/11 | 400 | 95.6 | 1.5 | 0.8 | 0.46 | 2.01 | 2.13 | 1.06 |
| 3B+ | 7/11 | 400 | 95.5 | 1.5 | 0.9 | 0.62 | 2.10 | 2.20 | 1.05 |

*compositions of the precursor after ignition at 600° C.,
+compositions also contain 0.9 wt %, CoO.

The pellets of the precursor 2B had a density of 2.4 g·cm⁻³. To illustrate the effects of deoxidation another sample of the pellets 2B was charged to a laboratory test reactor normally used for the carbon monoxide/steam shift reaction and de-oxidised in the following conditions:

| Pressure | 1 bar abs. | |
|---|---|---|
| Temperature | 300° C. | |
| Gas mixture % v/v | $H_2$ | 40 |
| | CO | 5 |
| | $CO_2$ | 5 |
| | steam | 50 |

The balance of oxidising gases ($H_2O$, $CO_2$) and reducing gases is such that the starting ferric oxide $Fe_2O_3$ is de-oxidised to $Fe_3O_4$ but not further. The reactor was cooled in a current of nitrogen, then discharged. The product was now stable to air provided it was kept cool. It was ground to a fine powder, mixed with 1.0% w/w of graphite and compressed into cylinders as before. Using the same applied pressure in the pelleting machine the pellet density was 3.5 g·cm⁻³.

It is expected that the activities of the pellets made from the de-oxidised material will be similar to those of the pellets 2B. However because of their much higher density, the activity per unit catalyst bed volume will therefore be significantly improved.

Not only do the catalysts of the invention have a high ratio of the final to initial activity but also, compared to the standard fused catalyst, they have a high relative activity. This increased activity enables lower ammonia converter temperatures to be employed thus enabling the converter pressure to be reduced, compared to conventional conditions, with consequent savings in compression costs.

I claim:

1. An alkali promoted oxidic catalyst precursor composition containing oxides of iron, aluminium, and at least one alkaline earth metal X, and a compound of an alkali metal having an atomic number greater than, or equal to, 19, and having
   (a) a BET surface area of at least 10 m²·g⁻¹,
   (b) an alkaline earth metal:aluminium atomic ratio of at least 1, and
   (c) an alkali metal:aluminium atomic ratio in the range 0.05 to 0.25, the proportions of said oxides being such that, after ignition at 600° C., the ignited composition contains
   (i) at least 75% by weight of iron oxide (expressed as $Fe_2O_3$),
   (ii) at least 0.5% by weight of aluminium oxide (expressed as $Al_2O_3$), and
   (iii) at least 0.5% by weight of said alkaline earth metal oxide (expressed as XO).

2. A composition according to claim 1 wherein the alkaline earth metal is magnesium.

3. A composition according to claim 1 wherein the proportions of aluminium and alkaline earth are such that, after ignition at 600° C., the combined weights of aluminium oxide (expressed as $Al_2O_3$) and alkaline earth oxide (expressed as XO) is less than 20% by weight of the ignited composition.

4. A composition according to claim 1 wherein at least half of the aluminium is present in regions, as determinable by scanning transmission electron microscopy, wherein the alkaline earth metal:aluminium atomic ratio is essentially 0.5.

5. An alkali promoted oxidic catalyst precursor composition containing oxides of iron, aluminium, and magnesium, and a compound of an alkali metal having an atomic number greater than, or equal to, 19, and having
   (a) a BET surface area of at least 10 m²·g⁻¹,
   (b) a magnesium:aluminium atomic ratio of at least 0.5, and
   (c) an alkali metal:aluminium atomic ratio in the range 0.05 to 0.25, less than half of the aluminium being present in regions, as determinable by scanning transmission electron microscopy, wherein the magnesium:aluminium atomic ratio is essentially 0.5,
the proportions of said oxides being such that, after ignition at 600° C., the ignited composition contains
   (i) at least 75% by weight of iron oxide (expressed as $Fe_2O_3$),
   (ii) at least 0.5% by weight of aluminium oxide (expressed as $Al_2O_3$), and
   (iii) at least 0.5% by weight of magnesium oxide (expressed as MgO).

6. A composition according to claim 5 wherein the proportions of aluminium and magnesium are such that, after ignition at 600° C., the combined weights of aluminium oxide (expressed as $Al_2O_3$) and magnesium oxide (expressed as MgO) is less than 20% by weight of the ignited composition.

7. A process for the production of an oxidic catalyst precursor composition having a BET surface area of at least 10 m²·g⁻¹ comprising (a) forming a slurry containing iron, aluminium, and magnesium compounds decomposable to oxides by heating by
  (i) forming a slurry of precipitated magnesium aluminate by mixing an aqueous solution containing a magnesium compound with an aqueous solution containing an alkali metal aluminate,
  (ii) mixing said slurry of magnesium aluminate with a precipitated hydrated ferric oxide, or precipitating a hydrated ferric oxide in the presence of said slurry of magnesium aluminate,
(b) drying said slurry to form an intimate mixture of said decomposable compounds; and
(c) calcining said intimate mixture at a temperature in the range of 200° to 500° C.

8. A process according to claim 7 wherein the precipitation of at least the iron is effected at a pH above 6.5.

9. A process according to claim 7 wherein the catalyst precursor composition also contains a compound of an alkali metal of atomic number greater than, or equal to, 19, introduced by impregnating the intimate mixture with a compound of the alkali metal before or after calcination.

10. A process according to claim 7 wherein said oxide catalyst precursor composition contains at least 75% by weight of iron oxide (expressed as $Fe_2O_3$) after ignition at 600° C.

* * * * *